United States Patent [19]

Dillon, Jr. et al.

[11] Patent Number: 4,671,621

[45] Date of Patent: Jun. 9, 1987

[54] OPTICAL SYSTEMS WITH ANTIRECIPROCAL POLARIZATION ROTATORS

[75] Inventors: Joseph F. Dillon, Jr., Morristown; John Hegarty, Gillette; Raymond Wolfe, New Providence, all of N.J.

[73] Assignees: American Telephone and Telegraph Company; AT&T Bell Laboratories, both of Murray Hill, N.J.

[21] Appl. No.: 728,669

[22] Filed: Apr. 29, 1985

[51] Int. Cl.⁴ ............................................. G02B 27/00
[52] U.S. Cl. ......................................................... 350/403
[58] Field of Search ................. 350/375, 377, 400, 403

[56] References Cited

U.S. PATENT DOCUMENTS

| 3,617,942 | 11/1971 | Kurtzig et al. | 350/151 X |
| 3,764,195 | 10/1973 | Blank et al. | 350/377 |
| 3,845,477 | 10/1974 | Le Craw et al. | 365/15 X |

OTHER PUBLICATIONS

Tien, P. K. "Light Waves in Thin Films and Integrated Optics" *App. Optics*, vol. 10, p. 2395, 1971.
Tien, P. K. "Switching and Modulation of Light in Magneto-Optic Waveguide Garnet Films", *App. Physics Ltrs*, vol. 21, No. 8, p. 394–396, Oct. 15, 1972.
Stolen, R. H. et al., "Faraday Rotation in Highly Birefringent Optical Fibers", *Applied Optics*, vol. 19, No. 6, 15 Mar. 1980.

*Primary Examiner*—Bruce Y. Arnold
*Attorney, Agent, or Firm*—Bernard Tiegerman

[57] ABSTRACT

An optical system, e.g., an optical fiber communication system or an optical mass storage device, which includes a linearly birefringent polarization rotator useful in an optical isolator or optical circulator, is disclosed. The rotator, which compensates for the effects of linear birefringence and is substantially antireciprocal, includes two or more material regions which are capable of subjecting incident light to elliptic birefringences. However, the sign and/or magnitude of the linear, or the sign and/or magnitude of the circular, components of the elliptic birefringences differ from region to region. Moreover, the length of each region, except the first or last region, is substantially equal to one-half the birefringent period of the region. The length of the first or last region, by contrast, is substantially equal to one-quarter the birefringent period of the region.

13 Claims, 15 Drawing Figures

OPTICAL SYSTEMS WITH ANTIRECIPROCAL POLARIZATION ROTATORS

BACKGROUND OF THE INVENTION

1. Field of the Invention

The invention pertains generally to optical systems, e.g., optical fiber communication systems and optical mass storage devices, and more particularly to optical systems having antireciprocal polarization rotators.

2. Art Background

Optical systems for communicating and storing information are known and are now commercially significant. For example, an optical communication system, as schematically depicted in FIG. 1, typically includes a semiconductor laser which emits a light signal, e.g., an information-carrying light signal, to an optical fiber, which transmits the light signal to a photodetector. An optical mass storage device, as schematically depicted in FIG. 2, typically includes an optical disk which is capable of being, or has been, processed to store information. This information is encoded onto the disk (through processing) as regions of different optical properties, e.g., different optical reflectivity. The disk is read, i.e., the information stored on the disk is detected, by shining light from a light source, e.g., a semiconductor laser, (typically through a beam splitter) onto the disk. The light reflected from the disk is then directed (i.e., reflected by the beam splitter) to a photodetector. Alternatively, the light transmitted by the disk is directed to a photodetector.

In a wide variety of optical systems, devices that rotate the polarizatio of linearly polarized light in the same sense irrespective of traversal direction are advantageously included. For example, the frequency and power intensity spectra of the light emitted by the semiconductor lasers employed in optical systems are altered when reflected light impinges upon the lasers. Such alterations are undesirable because they lead to errors in the detected informatio. Thus, efforts have been made to develop devices, called optical isolators, for isolating the semiconductor lasers from reflected light. An optical isolator based on rotation of linearly polarized light is exemplified, as depicted in FIG. 3, by a bulk magnetic garnet material, e.g., bulk single crystal yttrium iron garnet ($Y_3Fe_5O_{12}$, called YIG) material, positioned between a polarizer and an analyzer. This optical isolator has been proposed for use with optical fiber communication systems operating at a wavelength of about 1.3 µm because single crystal YIG is substantially transparent (at least 50 percent of the incident light is transmitted) at infrared wavelengths (wavelengths ranging from about 0.8 µm to about 6 µm). In operation, a magnet is employed to magnetize the YIG (in the direction of light propagation). Linearly polarized light emitted by a laser and transmitted by the polarizer is directed into the YIG material. Under the influence of the net magnetic moment within the (magnetized) material, the linearly polarized light experiences circular birefringence. (In a bulk material, e.g., bulk single crystal YIG, linearly polarized light may be represented as consisting of right- and left-circularly polarized components. Circular birefringence means the two components see different indices of refractions, resulting in one of these components propagating through the material at a faster speed than the other). As a consequence, the light remains linearly polarized, but the polarization direction is continuously rotated in either the clockwise or counterclockwise (as viewed in FIG. 3) direction as the light traverses the material. (This phenomenon, commonly referred to as the Faraday Effect or magneto-optical rotatio, is described in, for example, the *McGraw Hill Encyclopedia on Science and Technology*, 5th edition, Vol. 5 (McGraw Hill, 1982), p. 314.) If the material is of appropriate dimension, the light is rotated through, for example, 45 degrees and is thus transmitted by an appropriately oriented analyzer. Reflected light transmitted by the analyzer also enters the YIG material and also undergoes a rotation of 45 degrees in the same direction as the light which originally traversed the material. Consequently, reflected light, after traversing the YIG material, is oriented at 90 degrees to the polarizer, and is thus precluded from impinging upon the laser. (The phenomenon by which is magnetized material rotates both forward and backward propagating linearly polarized light by 45 degrees (or an odd multiple of 45 degrees) in the same direction is denoted antireciprocal magneto-optical rotation. Devices which include such materials are referred to as antireciprocal devices.)

A second type of device based on rotation of linearly polarized light is circulator. Such a device as employed, for example, in an optical communication system efficiently couples light signals from a semiconductor laser into one end of an optical fiber, and allows detection of counterpropagating light signals emanating from the same fiber end. One type of optical circulator (having a configuration suitable for efficiently coupling light into and out of an optical fiber end) is depicted in FIG. 4. This circulator, like the exemplary isolator, includes bulk single crystal YIG, and also includes a polarization sensitive reflector. In operation, a magnet is used to magnetize the YIG in the direction of light propagation. Linearly polarized light, e.g., horizontally (as viewed in FIG. 4) linearly polarized light, emanating from the optical fiber end, is directed into the magnetized YIG. (The optical fiber is, for example, a polarization preserving fiber. Alternatively, an appropriately oriented polarizer is positioned between a non-polarization-preserving fiber and the YIG.) If the YIG is of appropriate dimension, the light is rotated through, for example, 45 degrees (in the clockwise direction, as viewed from the fiber in FIG. 4) and is transmitted by the polarization sensitive reflector to a detector. Linearly polarized light emitted by a laser and oriented at, for example, −45 degrees (relative to the linearly polarized light emanating from the fiber) is reflected by the polarization sensitive reflector into the magnetized YIG. After propagating through the YIG, this light has been rotated 45 degrees (in the clockwise direction, as viewed from the fiber in FIG. 4), and thus enters the fiber horizontally linearly polarized.

While antireciprocal, light rotating devices based on bulk materials, e.g., single crystal YIG isolators and circulators, are useful, they are bulky (have typical dimensions of 3 mm by 3 mm by 3 mm), required the application of large magnetic fields (typically larger than about 1000 oersteds (Oe), are expensive (typically costing about 1000 dollars), and are thus not entirely commercially attractive. By contrast, a thin (having a thickness less than about 10 times the wavelength of the incident light) film waveguide antireciprocal device, e.g., an optical isolator of circulator, using planar magnetization would be a much more attractive device. For example, a thin film device would permit the use of guided wave optics (and thus eliminate the need for focusing lenses, not shown in FIGS. 1 and 2), require the application of relatively small magnetic fields (smaller than about 100 Oe), and be relatively inexpensive. In addition, it could also serve as a building block for integrated optical devices (an optical device which includes two or more components, performing different functions, and formed on the same substrate) useful in optical systems.

While thin film antireciprocal devices appear to be attractive, thin film waveguides are subject to linear birefringence. (In a thin film, linearly polarized light may be represented as consisting of two orthogonal, linearly polarized components. In one of these components, the electric field of the light (an electromagnetic wave) is oriented parallel to the film surface and is denoted the TM component. In the other component, the electric field is oriented perpendicularly to the film surface and is denoted the TE component. Linear birefringence means the two components see different indices of refraction, resulting in one of these components propagating through the film at a faster speed than the other. Regarding linear birefringence inthin film waveguides see, e.g., P. K. Tien, *App. Opt.*, Vol. 10, p. 2395 (1971).) Thus, when traversing a magnetized thin film, light is subjected to elliptic birefringence, i.e., a birefringence which includes both a linear component and a circular component. As a consequence, initially linearly polarized light undergoes oscillatory rotation. (The distance traversed by the light in completing one oscillation is called the birefringent period, p.) This oscillation is depicted in FIG. 5 where the incident light impinges upon a magnetized thin film at an angle of, for example, 0 degrees (to the y-axis). While propagating through the film, the light is initially rotated through a relatively small angle, e.g., 3 degrees, in, for example, the clockwise direction. Further propagation produces a counterrotation to $-3$ degrees, and still further propagation to a distance P results in the light returning to its initial orientation (i.e., parallel to the y-axis). During this oscillatory rotation, the polarization of the light also varies continuously from linear to elliptic to linear. Because the amplitude of the oscillation is constant and, for most materials, small, e.g., 3 or 4 degrees, little or no net rotation is achieved. As previously discussed, an antireciprocal device must achieve a rotation substnatially beyond that normally achieved in linearly birefringent materials, and on exiting, the light should be substantially linearly polarized to avoid, for example, optical power loss at the analyzer of an optical isolator. Thus, linearly birefringent devices have effects which, without compensation, preclude their advantageous use.

A magnetized, thin film optical device advantageously used as an optical switch or modulator, which compensates for the effects of linear birefringence, has been reported. (See P. K. Tien et al, "Switching And Modulation of Light in Magnetio-Optic Waveguide Garnet Films", *Applied Physics Letters*, Vol. 21, No. 8, (Oct. 15, 1972), pp. 394–396, and U.S. Pat. No. 3,764,195 issued to Blank et al on Oct. 9, 1973). This device, pictured in FIG. 6, includes a magnetic garnet film epitaxially grown on a garnet substrate, and a serpentine microcircuit formed on the upper surface of the garnet film. The microcircuit is formed so that the direction of current flow through the circuit is reversed every half birefringent period. Thus, the direction of magnetization (along the direction of light propagation) in the thin film is reversed every half birefringent period, which allows rotation beyond that normally achieved in a linearly birefringent material, but does not eliminate ellipticity in polarization.

A device which is subject to linear birefringence and is useful as a circulator or isolator, has also been reported. (See R. H. Stolen et al, "Faraday Rotation in Highly Birefringent Optical Fibers," *Applied Optics*, Vol. 19, No. 6 (Mar. 15, 1980), pp. 842–845 and E. H. Turner et al, "Fiber Faraday Circulator or Isolator," *Optics Letters*, Vol. 6, No. 7 (July 1981), pp. 322–323.) This device includes a linearly birefringent optical fiber and a plurality of spaced magnets which magnetize (in the direction of light propagation) a numer of fiber regions. The polarity of each magnet is the reverse of the previous magnet, while the spacing between the magnets in half the birefringent period of the fiber. The number of spaced magents, and thus the number of correspondingly spaced magnetized fiber regions, is empirically chosen (in relation to the particular fiber) so that light exiting the last magnetized fiber region is elliptically polarized and the light intensities along the two birefingence axes of the fiber are equal. In operation, the elliptic polarization is changed to linear polarization by passing the light through a relatively long (about six birefringent periods), nonmagnetized and heated portion of the fiber extending from beyond the last magnetized fiber region. The amount of heat is determined empirically. Alternatively, the light is passed through an external compensator, which also converts the elliptic polarization to linear polarization. The settings of the compensator (needed to achieve linear polarization) is also determined empirically. Rotation beyond that normally achieved in a linearly birefringent material, elimination of ellipticity in polarization, and thus use as an antireciprocal device is achieved. However, those engaged in the development of optical systems have sought, thus far without success, linearly birefringenet optical isolator/circulator devices in which elliptically polarized light is conveniently (rather than empirically) converted to linearly polarized light.

SUMMARY OF THE INVENTION

The invention involves an optical system which includes a linearly birefringent, substantially antireciprocal device, e.g., an optical isolator or circulator. The device increases the amplitude of the oscillation (which is either rectified or nonrectified) suffered by incident light to achieve a net rotation (beyond that normally achieved in linearly birefringent materials) substantially equal to 45 degrees, within a finite distance. In addition, the device conveniently converts elliptic polarization to linear polarization without the addition of het or other empirical expedients. Moreover, this convenient conversion is achieved by a device component which is designed into the device.

The device employed in the inventive optical system includes a number of material regions which exhibit (in operation) elliptic birefringences in the light propagation direction, with either the sign and/or magnitude of the linear, or the sign and/or magnitude of the circular, components of the elliptic birefringences changing from region to region. (In, for example, a thin film, a change in the sign and/or magnitude of the linear component implies, in the absence of magnetization, a change in the sign and/or magnitude of the difference in velocities between the TE and TM components. A change in the sign and/or magnitude of the circular component implies, in the absence of linear birefringence, a change in the sense (direction) and/or magnitude of the Faraday rotation.) Each region (except one) of the device has a length (in the light propagation direction) substantially equal to one-half the birefringent period of that region. However, in contrast to previous such devices, substantially antireciprocal operation is only achieved if either the first or the last material region has a length substantially equal to one-fourth the birefringent period. If the last region is one-fourth period in length, then substantially antireciprocal operation is achieved only if the polarization of the linearly polarized light incident on the first half period region is substantially parallel to one of the linear birefringence axes of the device. If the first region is one-fourth period in length, then substantially antireciprocal operation is achieved only if the polarization of the light incident on this region is oriented at an angle substantially equal to 45 degrees relative to one of the linear birefringence axes of the device.

BRIEF DESCRIPTION OF THE DRAWING

The invention is described with reference to the accompanying drawings, wherein.

DETAILED DESCRIPTION

The invention involves an optical system, e.g., an optical fiber communication system or an optical mass storage device. This system prevents errors in detected information, and/or efficiently couples ligth into and out of an optical fiber end, while avoiding the use of either a bulk optical isolator or a bulk optical circulator.

Figure 1:
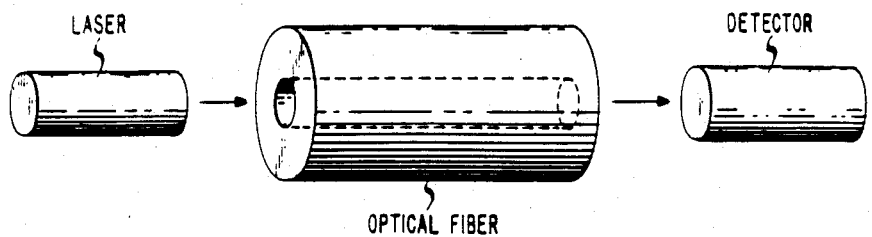
FIGS. 1 and 2 are, respectively, a schematic diagram of a conventional optical fiber communication system and a schematic diagram of a conventional optical mass storage device.
Figure 2:
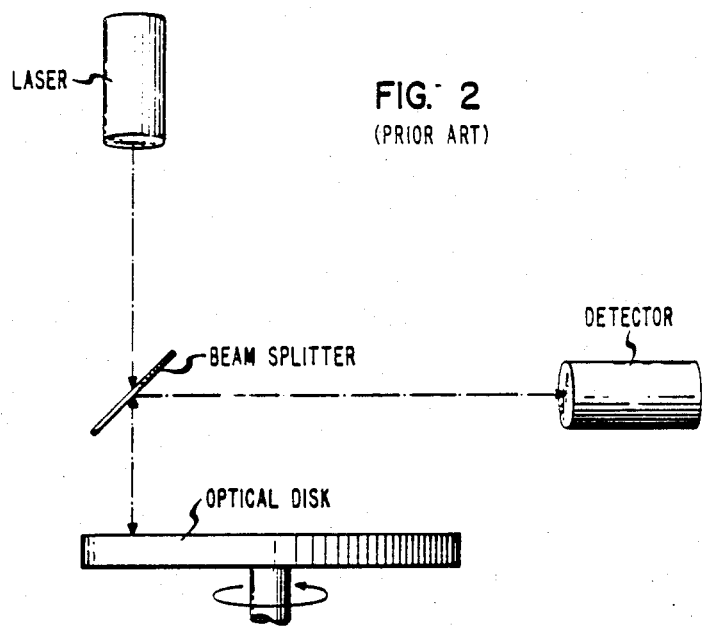
Figure 3:
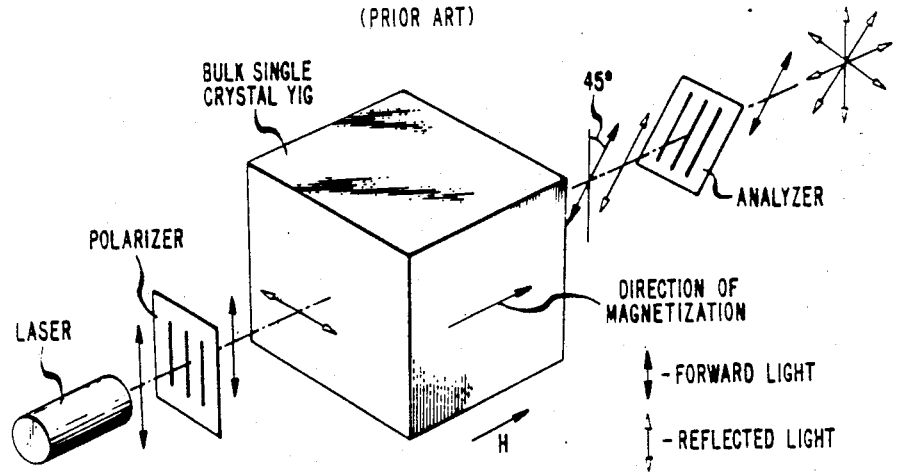
FIG. 3 is a schematic diagram of an optical system which includes a conventional, bulk single crystal magnetic garnet optical isolator.
Figure 6:
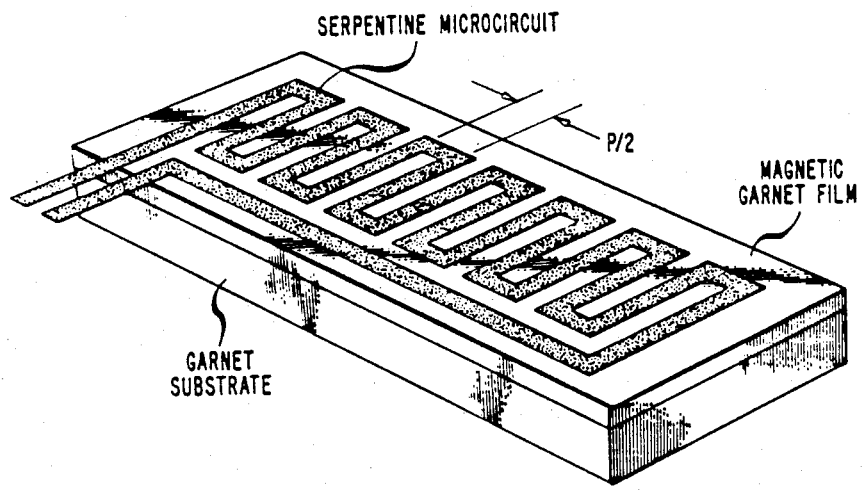
FIG. 6 depicts a known device, which includes thin film magnetic garnet material, believed useful as an optical switch or modulator.
Figure 4:
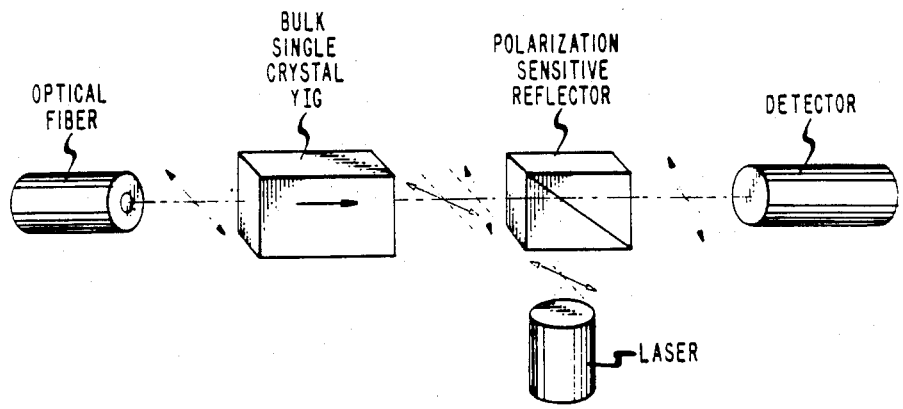
FIG. 4 is a schematic diagram of an optical system which includes a conventional, bulk single crystal magnetic garnet optical circulator.
Figure 5:
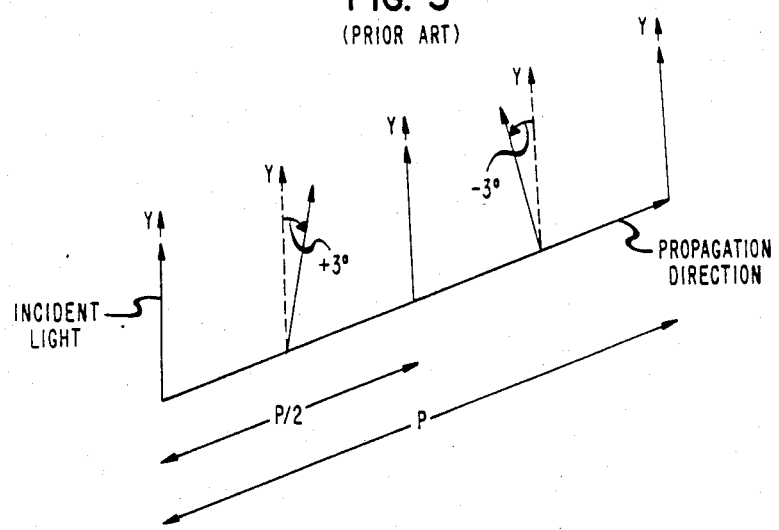
FIG. 5 depicts the oscillatory rotation suffered by light in a magnetized, linearly birefringent medium.
Figure 7:
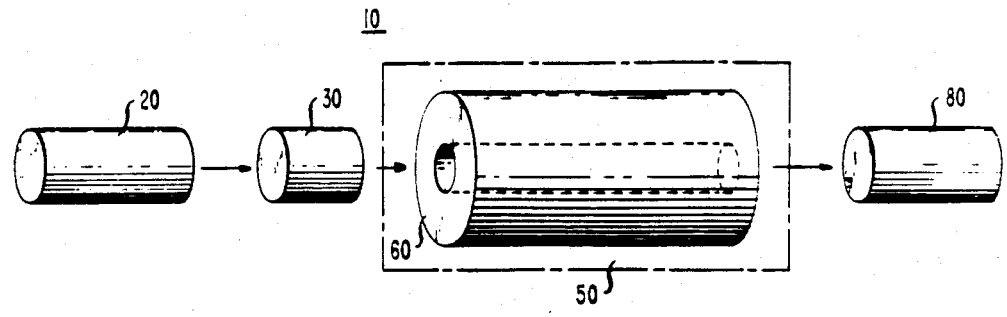
FIGS. 7-9 are schematic diagrams of three embodiments of the inventive optical system.
Figure 8:
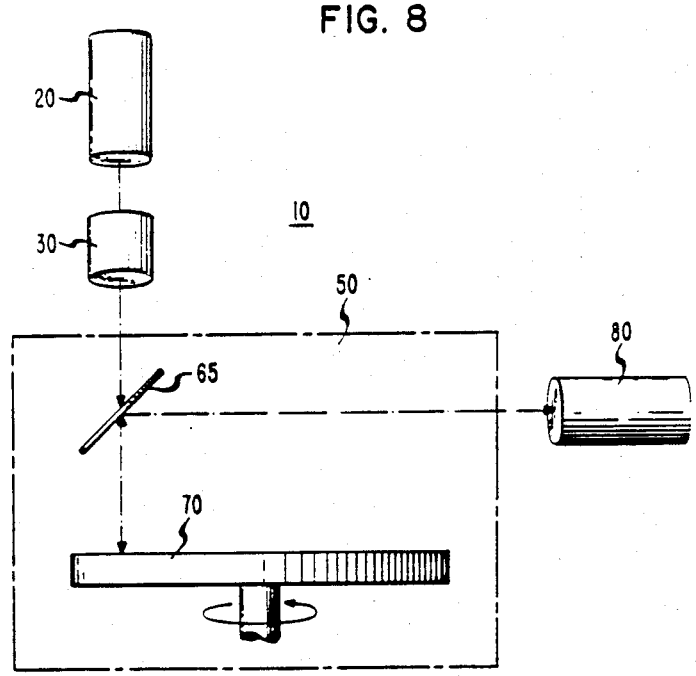
Figure 9:
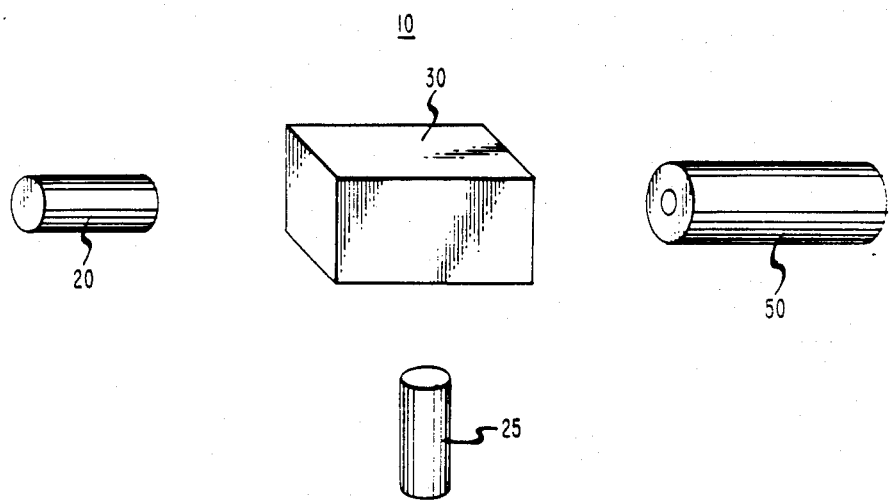

With reference to FIGS. 7-9, the inventive optical system 10 includes a system component 30 which is an antireciprocal device, e.g., an optical isolator or an optical circulator, and which includes linearly birefringent material. If, for example, the component 30 is an optical isolator, then the system 10 also generally includes the components depicted in FIGS. 7-8. That is, the system includes an optical source 20, e.g., a semiconductor laser, a system component 50 impinged upon by light emitted by the source 20 and transmitted by the optical isolator 30, as well as a photodetector 80. As shown in FIG. 7, the system component 50 includes, for example, an optical fiber 60. Alternatively, and as shown in FIG. 8, the system component 50 includes a beam splitter 65 and an optical disk 70.

If, for example, the system component 30 is an optical circulator then, as depicted in FIG. 9, the system 10 generally includes an optical source 20 and optical detector 25, as well as optical fiber 50. Light emitted by the source 20 is coupled into one end of the fiber 50 by the circulator 30. The circulator 30 also serves to couple light emanating from the fiber end into the detector 25. Generally, another optical detector and/or optical source (with or without the circulator 30) are positioned at the opposite end of the fiber. (It is assumed that in this embodiment, the optical fiber 50 is, for example, a polarization-preserving fiber. If not, then the system also includes a polarizer between the fiber 50 and the optical circulator.)

If the system component 30 is an optical isolator (see the four embodiments shown in FIGS. 10-13), then the isolator includes material 40 positioned between a polarizer 32 and an analyzer 48. The polarizer 32 and analyzer 48 are, for example, polarizing optical fibers. If the presence of the polarizer is inconvenient, then it is readily replaced by a region of metal (not shown), e.g., aluminum or gold or titanium, overlying a portion of the material 40 (traversed by light) and positioned adjacent to the optical source 20. Such a metal region absorbs reflected (backward propagating) light having a polarization transverse to that of the (forward propagating) light emitted by the optical source 20. Preferably, the thickness of the metal region ranges from about 0.01 $\mu$m to about 10 $\mu$m. Thicknesses less than about 0.01 $\mu$m are undesirable because the resulting films have undesirably low optical absorption. Thicknesses greater than about 10 $\mu$m, while not precluded, are less desirable because the resulting films do not yield greater optical absorption than thinner films, and require undesirably long fabrication times.

In operation, the analyzer 48 and material 40 serve to align the polarization of reflected (backward propagating) light substantially perpendicularly to the polarizer, thus precluding transmission to the optical source 20. If the source 20 is substantially unaffected by such perpendicularly aligned light, then the polarizer 32 (or the metal region) need not be included.

Figure 14:
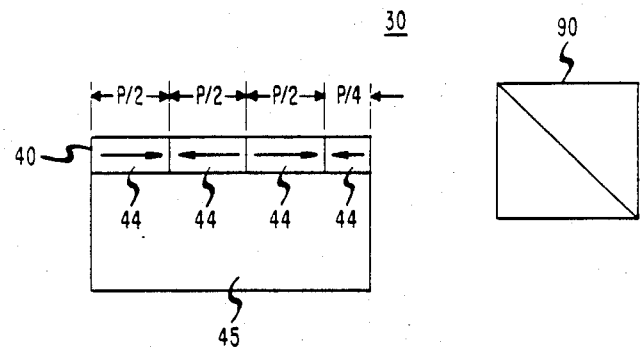
FIG. 14 depicts one embodiment of the optical circulator employed in the inventive optical system.
Figure 10:
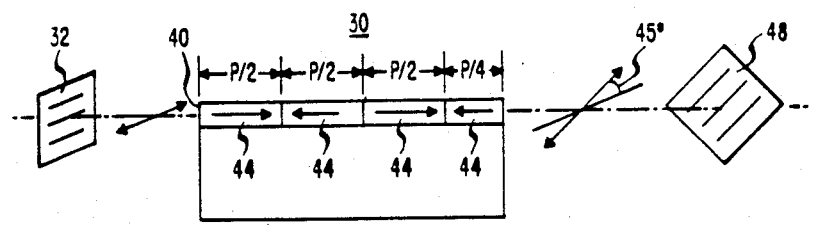
FIGS. 10-13 depict four embodiments of the optical isolator employed in the inventive optical system.
Figure 11:
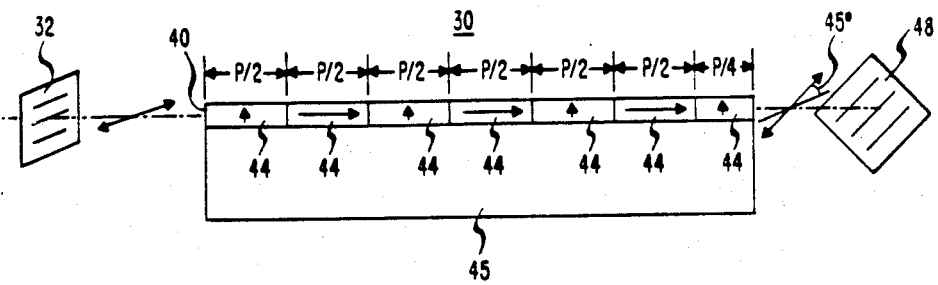

If the system component 30 is an optical circulator, then the circulator includes (see the embodiment shown in FIG. 14) the material 40. In addition, the circulator includes means 90 for directing two light beams, having different polarizations, along two different optical paths, e.g., a polarization sensitive reflector or well known functional equivalents such as a rutile plate or plates.

The material 40 employed in the antireciprocal device, e.g., the isolator or circulator, includes a number of material regions 44 which are traversed by both forward and backward propagating light. Each of these regions is substantially transparent (at least 50 percent of the incident light is transmitted) to the light, and at least some of these regions are magnetic (i.e., magnetizable). While neither the thicknesses nor the compositions of the material regions need be the same, ease of manufacture generally favors essentially uniform thicknesses and compositions. In addition, the material regions 44 are preferably fabricated in the form of a continuous thin film (having a thickness less than about 10 times the wavelength of the incident light), although thick films are useful and are not precluded. Such thin and thick films are subject to linear birefringence, and consequently the magnetic regions, when magnetized (in the direction of light propagation), exhibit elliptic birefringences. If formed as a thin film, the material regions 44 preferably have a thickness ranging from about 0.1 μm to about 100 μm. Thicknesses less than about 0.1 μm are undesirable because such films are relatively poor optical waveguides. Thicknesses greater than about 100 μm are undesirable because light propagating through such thick films undergoes an undesirably large amount of spreading (in the thickness direction), making it difficult to couple the light directly into other optical components.

To overcome the effects of linear birefringence conveniently, i.e., to rotate incident linearly polarized light through an angle substantially equal to 45 degrees (or an odd multiple of 45 degrees) and conveniently convert elliptic polarization to linear polarization, the antireciprocal device 30 should meet two conditions. First, either the sign and/or magnitude of the linear components, or the sign and/or magnitude of the circular components, of the elliptic birefringences exhibited by the (magnetized) regions 44, should change from region to region. Secondly, each of these material regions, with the exception of either the first or the last region, should have a length in the light propagation direction which is substantially equal to one-half the birefringent period (P) in that region. (The birefringent period for each region is the distance light must propagate through that region to complete one full oscillation in its polarization orientation.) The first or the last region, by contrast, should have a length substantially equal to one-fourth the birefringent period in the first or the last region. It must be emphasized that in the absence of such a first or last region, the exiting light will not be oriented at 45 degrees (to the incident light) and will, in general, be elliptically polarized. (The birefringent period, P, in each of the regions 44 is not necessarily the same because the period depends on a number of parameters, e.g., the composition of the region, degree of magnetization in the region and wavelength of the incident light. Consequently, the birefringent period for each region is generally measured for the particular conditions under which that region is to operate. Useful measurement techniques are described in, for example, K. Ando et al, "Growth Induced Optical Birefringence in LPE-Grown Bi-Based Iron Garnet Films," *Japanese J. Appl. Phys.*, Vol. 22, No. 10, October 1983, pp. L618–L620.)

Figure 12:
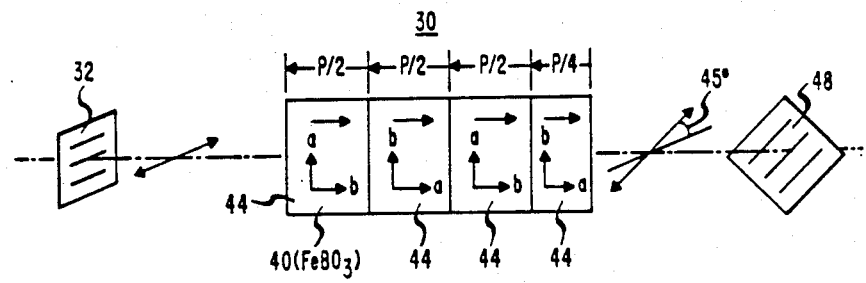
Figure 13:
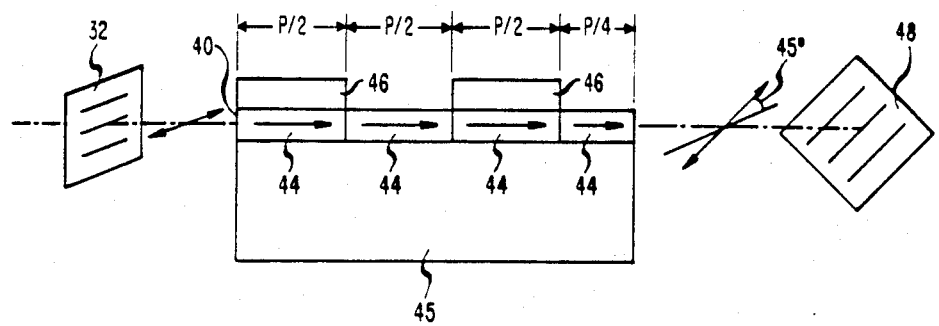

Exemplary embodiments of the optical isolator/circulator 30, which incorporate the above two conditions, are depicted in FIGS. 10–14. For example, in the ebodiment depicted in FIG. 10, the sign of the circular component of the elliptic birefingences changes from region to region, i.e., the direction of the magnetization (depicted by a single-headed arrow) alternates. (Nonmagnetized regions of length P/2, or regions of length P/2 in which the magnetization is oriented perpendicularly to the light propagation direction, interposed between the magnetized regions, are not precluded. The presence of such regions only affects the direction of rotation, i.e., in some instances such regions convert, for example, a +45 degree rotation to a −45 degree rotation.) In the embodiment depicted in FIG. 11, it is the magnitude of the circular component which changes from region to region (the second, fourth and sixth regions in FIG. 11 have nonzero circular components because the magnetizations are aligned parallel to the light propagation direction, while the first, third, fifth and seventh regions have zero circular components because the magnetizations are aligned perpendicularly to the light propagation direction). On the other hand, the sign of the linear components of the elliptic birefringences alternates in the embodiment depicted in FIG. 12 (which is described more fully below). For the embodiment depicted in FIG. 13, it is the magnitude of the linear components which changes from region to region. (One technique for producing changes in the magnitudes of the linear components is to form every other material region with a different thickness. Alternatively, and as depicted in FIG. 13, all of the regions are initially fabricated with a uniform thickness, and then a region of material 46, having a refractive index less than that of the underlying region 44, is formed over every other region 44, using conventional selective deposition and/or etching techniques.)

In general, the number of regions having lengths substantially equal to P/2 needed to achieve a rotation substantially equal to 45 degrees (or an odd multiple of 45 degrees) is determined empirically (by, for example, measuring the rotation, beyond that normally achieved in a linearly birefringent material, produced by control samples having different numbers of regions). For purposes of the inention, a rotational angle is substantially equal to 45 degrees, or an odd multiple of 45 degrees, provided the intensity of the light emitted by the optical source 20 is at least 10 times greater than the intensity of the reflected light transmitted by the polarizer 20. In addition, and for purposes of the invention, the material regions have lengths substantially equal to P/2 and P/4 provided the number of regions has been chosen to produce, for example, a 45 degree rotation and the intensity of the light emitted by the optical source 20 is, again, at least 10 times greater than the intensity of the reflected light transmitted by the polarizer 32.

It has been found that when the compositions and thicknesses of the material regios 44 are essentially identical, and polarization rotation is achieved by using reversals in magnetization direction, then the number, N, of regions having lengths of P/2 needed to achieve a 45 degree rotation is well approximated by the relation $$\tan^{-1}(2F/\Delta\beta) = 90°/(2N+1) \qquad (1).$$

Here, F denotes the (uniform) magnitude of the specific Faraday rotation (the number of degrees of rotation per unit length) within the material regions. On the other hand, $\Delta\beta$ denotes the (uniform) magnitude of the linear birefringence in the regions (i.e., $\Delta\beta = 2(\pi/\lambda)|n_{TM} - n_{TE}|$ where $n_{TM}$ and $n_{TE}$ denote, respectively, the effective index of refraction seen by the TM wave and teh effective index of refraction seen by the TE wave, and λ denotes the wavelength of the light in vacuum.)

If it is desired to use a number (N) of material regions which does not satisfy Equation (1) (for a particular wavelength of light, λ), then this desired number can still be used, and Equation (1) can still be satisfied (for the particular wavelength of light, λ) by altering F and/or $\Delta\beta$. For example, F is readily altered by altering the magnetization component in the light propagation direction. Such an alteration is readily achieved by, for example, rotating the magnetic field used to align the magnetization so that the magnetization is not prallel to the light propagation direction (thus reducing the magnetization component in the light propagation direction). Alternatively, $\Delta\beta$ is readily altered by (uniformly) changing the thickness of the material regions 44, or by forming one or more layers of material, having lower refractive indices from that of the regions 44, overlying and/or underlying the regions 44. Useful materials include, for example, silicon dioxide, silicon nitride, and gadolinium gallium garnet.

Once the number of regions needed to achieve 45 degree rotation has been determined (either empirically or, for example, by using Equation (1)), then a rotation equal to any desired multiple of 45 degrees is readily achieved by using a multiple of the (original) number of regions. However, the ordering of each successive set of regions should be the reverse of the previous set. For example, if three P/2 regions and a P/4 region (having for example, magnetization reversals) produces a 45 degree rotation, then an additional P/4 region (with no magnetization reversal between the two P/4 regions) followed by an additional three P/2 regions (exhibiting magnetization reversals) will produce a 90 degree rotation. Further, the addition of three P/2 regions followed by a P/4 region will produce a 135 degree rotation.

It has been found that substantially antireciprocal operation is readily achieved with the inventive device (regardless of whether it produces a rotation of 45 degrees or an odd multiple of 45 degrees) provided either one of two conditions is met. The first condition is that if the P/4 region is the last material region, then the incident light should impinge upon the first material region substantially parallel to one of the two axes of linear birefringence of the device. (The linear birefringence axes denote two directions in the device which are readily determined empirically, in the absence of magnetization. For example, if linearly polarized light impinges upon unmagnetized control samples of the device at arbitrary orientations, then the linear birefringence axes are those orientations which produce no changes in polarization.) The second condition is that if the P/4 region is the first material region, then the incident light should inpinge upon this region at an angle substantially equal to 45 degrees (i.e., +45 degrees or −45 degrees) relative to either one of the linear birefringence axes. (For purposes of the invention, the incident light is substantially parallel to one of the birefringence axes, or is oriented at an angle substantially equal to 45 degrees relative to one of the birefringence axes, and thus substantially antireciprocal operation is achieved, provided two conditions are met. First, the number and lengths of the material regions should be chosen to produce a rotation of 45 degrees, or an odd multiple of 45 degrees. Secondly, the intensity of the light emitted by the optical source 20 should be at least 10 times greater than the intensity of the reflected light transmitted by the polarizer 32.)

A variety of (magnetic) materials is useful in the inventive device, with the degree of utility depending, in part, on the degree of transparency to the incident light. for example, YIG is a useful material which is substantially transparent to infrared light (light having a wavelength ranging from about 0.8 $\mu$m to abut 6 $\mu$m). Iron borate (FeBO$_3$) is also useful, and is substantially transparent to light of wavelengths ranging from about 0.5 $\mu$m to about 4 $\mu$m. In addition, cadmium manganese telluride is useful, and is substantially transparent to light of wavelengths ranging from about 0.6 $\mu$m to about 0.5 $\mu$m. Other useful materials are listed in, for example, the chapter by W. J. Tabor entitled "Magneto-Optic Materials" in *Laser Hndbook*, edited by E. T. Arecchi and E. O. Schulz-DuBois (North Holland Publishing Company, Amsterdam, 1972).

A number of methods are available for producing material regions having alternating (in sign) linear or circular birefringences. For example, iron borate (FeBO$_3$), a magnetic material, evidences both circular birefringence (when magnetized) and crystalline (a form of linear) birefringence. (The two crystallographic axes of FeBO$_3$ are labeled a and b in FIG. 12.) Thus, by stacking oppositely oriented crystalline sections next to one another (as depicted in FIG. 12), a magnetic material is achieved having regions of alternating (in sign) linear birefringence. (Regarding this technique, see U.S. Pat. No. 3,617,942 issued to Kurtzig et al on Nov. 2, 1971, which is hereby incorporated by reference.)

A method for producing material regions having alternating (in sign) circular birefringences involves the application of oppositely directed magnetic fields to adjacent magnetic regions. This is achieved, for example, by forming a serpentine microcircuit on the surface of the magnetic material and producing a current in the circuit (as described in U.S. Pat. No. 3,764,195, issued to Blank et al on Oct. 9, 1973, which is hereby incorporated by reference).

Another technique for forming material regions having alternating circular birefringences, readily applicable to, for example, thin film magnetic garnet waveguides, e.g., thin film YIG waveguides, involves producing changes in sublatticemagnetizations. For example, the structure of YIG (Y$_3$Fe$_5$O$_{12}$) is such that three of the five iron atoms of each molecule are located at tetrahedral lattice sites, while the remaining two iron atoms are located at octahedral sites. In addition, the three magnetic moments at the tetrahedral sites (associated with the tetrahedral iron atoms) are parallel to each other but antiprallel to the two magnetic moments at the octahedral sites. Thus, in the presence of an external magnetic field, the (dominant) tetrahedral moments align parallel to the field, while the octahedral moments align antiprallel to the field. Significantly, it is the direction of the octahedral moments which largely determines the direction of Faraday rotation.

Regions of alternating (in sign) circular birefringences in YIG are produced, for example, by reducing the magnitudes of the tetrahedral moments in selected material regions to the point where the octahedral moments in these regions are dominant. Consequently, in the presence of a magnetic field, the (now dominant) octahedral moments in the selected regions align parallel with the field, whereas the octahedral moments in the nonselected regions (where the tetrahedral moments are still dominant) align antiparallel to the field, resulting in Faraday rotations of opposite sign in the selected and nonselected regions.

Reductions in tetrahedral moments in selected YIG material regions are readily achieved by the (at least partial) substitution of nonmagnetic ions, e.g., gallium or aluminum or germanium ions, for the iron atoms located at tetrahedral sites. Such substitution is produced, for example, by initially forming, i.e., growing, the YIG material with nonmagnetic ions at both the octahedral and tetrahedral lattice sites, and then moving the nonmagnetic ions (as described below) from the octahedral to the tetrahedral lattice sites, in the selected regions.

The movement of nonmagnetic ions between lattice sites, referred to above, is readily achieved using the procedure described in U.S. Pat. No. 3,845,477 issued to Le Craw et al on Oct. 29, 1974, which is hereby incorporated by reference. Here, a thin film of YIG doped with a nonmagnetic ion is epitaxially grown, using conventional techniques, on a substrate 45 (see FIG. 7) of, for example, gadolinium gallium garnet (GGG). The doped YIG film should have a composition close to the "compensation point" (the composition which results in a zero net magnetic moment), but one such that the net tetrahedral moment still dominates the net octahedral moment. Thus, if the nonmagnetic ions is, for example, gallium, then the composition is preferably $Y_3Ga_xFe_{5-x}O_{12}$ where $1.05 \leq X 1.45$. Values of x less than about 1.05 are undesirable because the resulting tetrahedral moments remain dominant even after the processing described below, i.e., octahedral domination is nowhere achieved. Values of x greater than about 1.45 are undesirable because the resulting octahedral moments are dominant and thus tetrahedral domination is nowhere achieved.

Preferential substitution of, for example, gallium ions for tetrahedrally located iron atoms in selected material regions is achieved by first forming a silicon region, having a thickness ranging from about 1000 to about 5000 Angstroms, over each of the selected material regions. The silicon regions are formed either by conventional selective deposition procedures or, alternatively, by forming a silicon layer covering the entire upper surface of the YIG film and then using conventional etching techniques to remove selected portions of the silicon layer. Then, the YIG film is annealed in an atmosphere of, for example, nitrogen at a temperature ranging from about 400 degrees Centigrade (C.) to about 800 degrees C. for a period of time ranging from about ½ hour to about 24 hours. Annealing temperatures less than about 400 degrees C. and annealing times less than about ½ hour are undesirable because they produce little or no transfer or gallium ions. Annealing temperatures greater than about 800 degrees C. and annealing times greater than about 24 hours are undesirable because all regions, including those not covered by cilison, undergo similar amount of gallium ion transfer. After cooling to room temperature (over any desired period of time), the regions not covered by silicon are essentially unchanged, whereas the silicon-covered regions experience gallium ion transfer from octahedral to tetrahedral lattice sites.

A new technique for producing material regions having alternating (in sign) circular birefringences in a thin YIG film involves using a film sufficiently doped with a nonmagnetic ion to achieve uniform octahedral domination. Then, by moving nonmagnetic ions from tetrahedral to octahedral lattice sites in selected material regions, these regions become tetrahedrally dominated. Consequently, and in the presence of a magnetic field, the octahedral moments in the selected material regions align themselves antiparallel to the magnetic field, while the octahedral moments in the non-selected regions align themselves parallel to the magnetic field.

As noted, the YIG films employed in the technique have a composition which, while close to the "compensation point", results in octahedral domination. If allium is the nonmagnetic ion, then the composition of this film is $Y_3Ga_zFe_{5-z}O_{12}$ where $1.1 \leq z \leq 1.5$. Values of z less than about 1.1 are undesirable because the resulting films have dominant tetrahedral (rather than dominant octahedral) moments. On the other hand, values of z greater than about 1.5 are undesirable because the resulting octahedral moments remain dominant, even after the processing described below.

Gallium ion transfer from tetrahedral sites to octahedral sites, in selected material regions, is achieved by heating the selected material regions to a temperature of at least 1200 degrees C. for a period of time equal to at least 1 μsec, and then cooling the selected material regions to room temperature over a period of time less than about 10 sec, and preferably less than about 0.1 sec. Heating temperatures less than about 1200 degrees C. and heating times less than about 1 μsec are undesirable because they result in undesirably small number of gallium ions being transferred from tetrahedral sites to octahedral sites. On the other hand, cooling times greater than about 10 sec are undesirable because undesirably many gallium ions, initially moved from tetrahedral to octahedral sites, move bak to tetrahedral sites, leaving sublattice dominance unchanged. The above heating and cooing procedure is readily achieved in selected material regions by selective scanning with a laser, e.g., a continuous wave (CW) argon ion laser.

The above-described techniques for modifying sublattice magnetizations assume that the YIG films (doped with nonmagnetic ions) have easy axes of magnetization which are parallel to the upper surfaces of the films (and thus aligned with the light propagation direction). However, the as-grown films typicallyexhibit both growth induced anisotropies and magnetostrictive, e.g., compressive, anisotropies. The former result in easy axes of magnetization which are perpendicular to the film surfaces, while the latter lead to easy axes of magnetization which are parallel to the film surfaces. If the growth induced anisotropies are so large that the easy axes of magnetization are perpendicular to the film surface, then these anisotropies must be eliminated. In most instances, this is readily achieved using conventional annealing techniques (see, e.g., A. J. Kurtzig and F. B. Hagedorn, "Noncubic Magnetic Anisotropies in Bulk and Thin Film Garnets," *IEEE Trans. Magnetism,* Vol. MAG7, p. 473 (1971).

It is known that doping YIG films with bismuth (which substitutes for Y) significantly increases the degree fo Faraday rotation but also leads to enhanced growth induced anisotropies. In addition, it has long been believed that these enhanced growth induced anisotropies cannot be annealed out of the material because the necessary temperatures are so high (higher than about 1300 degrees C.) that the YIG filmsare seriously damaged or destroyed (see e.g., P. Hansen et al, "Magnetic and Magneto-Optical Properties of Bismuth-Substituted Gadolinium Iron Garnet Films", *Physical Review B,* Vol 27, No. 7, Apr. 1, 1983, pp. 4375–4383).

It has been found that the growth induced anisotropies of bismuth-doped YIG films are readily annealed out of the films, without damaging the films by doping the films with Ca (which replaces Y) prior to annealing. Preferably, the composition of the bismuthand calcium-doped films is $Y_{3-a-b}Bi_aCa_bFe_{5-c}X_cO_{12}$, where $0.2 \leq a \leq 2.0$, $0.001 \leq b \leq 0.1$, X denotes, for example, a nonmagnetic ion, e.g., gallium, and c denotes the amount of X per unit formula. In addition, annealing temperatures preferably range from about 900 degrees C. to about 1300 degrees C. and annealing times preferably range from about ½ hour to about 24 hours. Values of a less than about 0.2 are undesirable because the resulting Faraday rotation is reduced rather than increased. Values of a greater than about 2.0 are undesirable because the growth of, for example, thin films of high optical quality is difficult. Values of b less than about 0.001 are undesirable because the required annealing temperature is undesirably high. Values of b greater than about 0.1 are undesirable because the resulting films have undesirably low transparencies to, for example, infrared light. Annealing temperatures less than about 900 degrees C. and annealing times less than about ¼ hour are undesirable because the growth induced anisotropies of the resulting films are undesirably high. Annealing temperatures greater than about 1300 degrees C. and annealing times greater than about 24 hours are undesirable because the resulting films are often decomposed.

A variety of techniques also exist for producing material regions in, for example, YIG, having magnetizations aligned parallel and perpendicular to the light propagation direction. One such technique is described, for example, by E. M. Gyorgy et al in "Local Control of Uniaxial Anisotropy In LPE Bubble Garnet Films", *Applied Physics Letters*, Vol. 25, No. 3, pp. 167-168 (1974).

EXAMPLE

A magnetic film of $Y_{3-a-b}Bi_aCa_bFe_{5-c}Ga_cO_{12}$, where a is about 0.5, b is about 0.03, and c is about 1.3, having a thickness of 2.8 μm, was grown on the (111) surface of a gadolinium gallium garnet (GGG) substrate, using conventional liquid phase epitaxy techniques. The growth temperature was about 900 degrees Centigrade (C.). This film had a growth induced anisotropy which produced an easy axis of magnetization perpendicular to the film surface. The film also had a compressive anisotropy, induced by the presence of the (Y-substituting) Bi and Ca, which, in the absence of the growth induced anisotropy, produces an easy axis of magnetization parallel to the film surface. (The Bi also increases the degree of Faraday rotation in the film.)

The film-supporting GGG substrate was placed between the pole pieces of a magnet, and the film was magnetized (to produce a net amoment aligned perpendicularly to the film surface) with a saturating magnetic field of 2000 Oe. White light was then passed through a monochrometer to produce light of wavelength equal to 1.5 μm, which was then directed into the film at normal incidence to the film surface. Using the conventional technique described in the chapter written by J. F. Dillion, Jr. in *Physics of Magnetic Garnets*, edited by A. Paoletti (North Holland, 1978), pp. 379-416, the Faraday rotation suffered by teh 1.5 μm light was measured to be 140 degrees/cm, the sign of this rotation corresponding to octahedral sublattice domination of the magnetization.

The growth induced anisotropy of the film was eliminated (producing an easy axis of magnetization parallel to the film surface) by initially annealing the film, in a nitrogen atmosphere, at about 1000 degrees C. for about 17 hours. The film was then slowly cooled (within the annealing furnace) to room temperature (about 23 degrees C.) over a period of about 17 hours.

Figure 15:
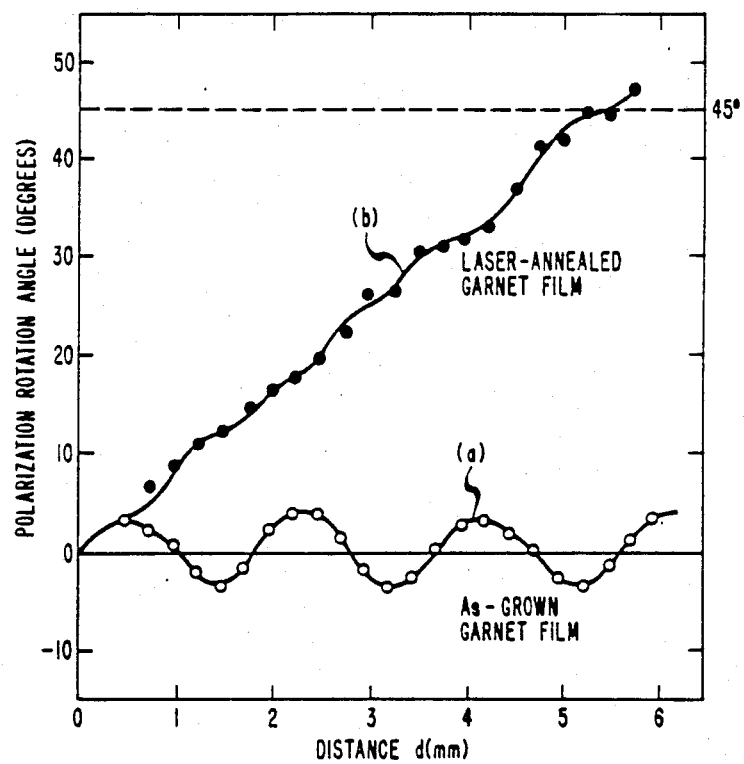
FIG. 15 depicts the degree of polarizatio rotation, as a function of light propagation distance, achieved with one embodiment of the antireciprocal device employed in the inventive optical system.

A small bar magnet (which produced a saturating magnetic field of about 100 Oe), aligned parallel to the film surface, was used to magnetize the annealed film (the net moment being parallel to the film surface). Linearly polarized, infrared light (of wavelength equal to 1.45 μm) from a $KCl:Tl^{(0)}$ color center laser (tunable from 1.4 μm to 1.6 μm), purchased from Burleigh Instruments Company of Fishers, N.Y., was then coupled into the film through a rutile prism (purchased from the Optics for Research Corporation of Caldwell, N.J.). (Of the several modes which could be coupled into the film, it was the $TM_0$ mode which was employed here.) The degree of rotation suffered by the light in traversing the film was measured by rotating an analyzer (positioned adjacent the output end of the film) relative to a polarizer (positioned adjacent the input end of the film) until a minimum in the intensity of the transmitted light was achieved. This procedure was then repeated with the coupling prism placed at different positions along the length of the film. The resulting polarization rotations, as a function of the distance traversed by the light, is plotted in FIG. 15(a). From this plot (which indicates the rotation oscillated from about +4 degrees to about −4 degrees), the birefringent period of the film was determined to be 1.84 mm.

A cw argon ion laser, whose light output was focused with a 20 cm focal length lens to a spot size (on the film) of about 40 μm, was used to laser anneal regions of the film (and thus produce regions of reversed sublattice magnetization). Annealing was achieved by setting the laser power at 0.85 watts (about 10 percent below the threshold for damage to the film) and moving the film relative to the laser (and parallel to a polished edge of the film) at 2 cm/sec, in a raster pattern with 20 μm spacing. Several hands 0.92 mm (half the birefringent period) wide were annealed, the annealed bands being separated by unannealed bands also having widths of 0.92 mm. A band having a width of 0.46 mm (one-fourth the birefringent period), next to the polished edge of the film, was left unannealed. The resulting laser annealed regions appeared dark compared to the unannealed regions.

To bleach the darkened, laser annealed regions, the film was heated in an atmosphere of $N_2$(85 percent by volume) and $H_2$(15 percent) at 350 degrees C. for about one hour.

Linearly polarized light from the color center laser was again coupled into the bleached, laser annealed film through the rutile prism. The resulting rotations of the light, as a function of the distance of the prism from the polished edge of the film (the distance traversed by the light), is plotted in FIG. 15(b). As is evident from this figure, the rotation increased monotonically with distance. (That is, the amplitude of the oscillations suffered by the light increased with distance.) Moreover, and after traversing 5 half birefrigent periods and 1 quarter birefrigent period (a total distance of 5.06 mm), the light had been rotated through an angle of +45 degrees and was linearly polarized.

To verify the antireciprocal nature of the rotation, light polarized at +45 degrees (and propagating in the reverse direction) was coupled into the polished edge of the film. This light was found to have an orientation of +90 degrees after traversing the one-fourth birefringent period- and five half birefringent period-length regions of the film.

What is claimed is:
1. An optical system, comprising:
   a source of electromagnetic radiation;
   a component of said system, capable of optical communication with said source, serving to transmit or reflect at least a portion of the electromagnetic radiation emitted by said source; and a substantially antireciprocal polarization rotator, capable of optical communication with said source and said component, characterized in that said polarization rotator includes two or more regions which are capable of subjecting electromagnetic radiation emitted by said source to elliptic birefringences, the sign and/or magnitude of the linear, or the sign and/or magnitude of the circular, components of said elliptic birefringences differing from region to region, and the length of each region, with the exception of either the first or last reigon, being substantially equal to one half the birefringent period of the region, the length of the first or last region being substantially equal to one quarter the birefringent period of the first or last region.

2. The optical system of claim 1 wherein said optical system includes an optical isolator, said isolator including said polarization rotator.

3. The optical system of claim 2 wherein said optical isolator further includes a polarizer and an analyzer.

4. The optical system of claim 1 wherein said optical system includes an optical circulator, said circulator including said polarization rotator.

5. The optical system of claim 4 wherein said circulator further includes a polarization sensitive reflector.

6. The optical system of claim 5 further comprising an optical detector capable of optical communication with said component through said polarization sensitive reflector.

7. The optical system of claim 1 further comprising an optical detector for detecting at least a portion of the electromagnetic radiation transmitted or reflected by said component.

8. The optical system of claim 1 wherein said source includes a semiconductor laser.

9. The optical system of claim 1 wherein said component includes an optical fiber.

10. The optical system of claim 1 wherein said component includes an optical disk.

11. The optical system of claim 1 wherein said regions include yttrium, iron and oxygen.

12. The optical system of claim 11 wherein said regions further include bismuth.

13. The optical system of claim 12 wherein said regions further include calcium.

* * * * *

UNITED STATES PATENT AND TRADEMARK OFFICE
CERTIFICATE OF CORRECTION

PATENT NO. : 4,671,621

DATED : June 9, 1987

INVENTOR(S) : Joseph F. Dillon, Jr., John Hegarty, and Raymond Wolfe

It is certified that error appears in the above—identified patent and that said Letters Patent is hereby corrected as shown below:

Column 1, line 40, "informatio" should read --information--.
Column 2, line 4, "rotatio" should read --rotation--; line 24, "circulator" should read --a circulator--; line 59, "required" should read --require--.
Column 3, line 31, "p." should read --P.--. Column 4, line 17, "in" should read --is--; line 18, "magents" should read --magnets--; line 54, "het" should read --heat--. Column 5, line 55, "ligth" should read --light--. Column 8, line 7, "inthe" should read --in the--; line 67, "prallel" should read --parallel--. Column 10, line 32, "sublatticemagnetizations" should read --sublattice magnetizations--. Column 11, line 7, "ona" should read --on a--, "7" should read --10--; lines 43-44, "cilison" should read --silicon--; line 44, "amount" should read --amounts--; line 64, "allium" should read --gallium--. Column 12, line 19, "bak" should read --back--; line 29, "typicallyexhibit" should read --typically exhibit--; line 59, "bismuthand" should read --bismuth and--. Column 13, line 49, "Dillion" should read --Dillon--. Column 14, line 29, "hands" should read --bands--. Column 15, line 15, "reigon" should read --region--.

Signed and Sealed this

Nineteenth Day of April, 1988

Attest:

DONALD J. QUIGG

*Attesting Officer*     *Commissioner of Patents and Trademarks*